United States Patent [19]

Dick

[11] 4,196,459

[45] Apr. 1, 1980

[54] HEADLAMP MOUNTING IN MOTOR VEHICLE BODIES

[75] Inventor: Heinz Dick, Odenthal, Fed. Rep. of Germany

[73] Assignee: Ford Motor Company, Dearborn, Mich.

[21] Appl. No.: 944,528

[22] Filed: Sep. 21, 1978

[30] Foreign Application Priority Data

Sep. 29, 1977 [DE] Fed. Rep. of Germany ....... 2743745

[51] Int. Cl.² .............................................. B60Q 1/06
[52] U.S. Cl. ....................................... 362/66; 362/80; 362/307; 362/311; 362/372
[58] Field of Search .................... 362/372, 66, 80, 307, 362/311

[56] References Cited

U.S. PATENT DOCUMENTS 4,110,819  8/1978  Ishikawa .......................... 362/66 X Primary Examiner—Stephen J. Lechert, Jr.
Attorney, Agent, or Firm—John J. Roethel; Keith L. Zerschling

[57] ABSTRACT

A headlamp mounting in motor vehicle bodies comprising a headlamp that is supported for swivelling movement about a fixed pivot point 6 and for adjustment in the forward and rearward directions with the aid of two adjusting devices 7 and 8. The headlamp is adjustable about a substantially horizontal axis and about a substantially vertical axis.

13 Claims, 8 Drawing Figures

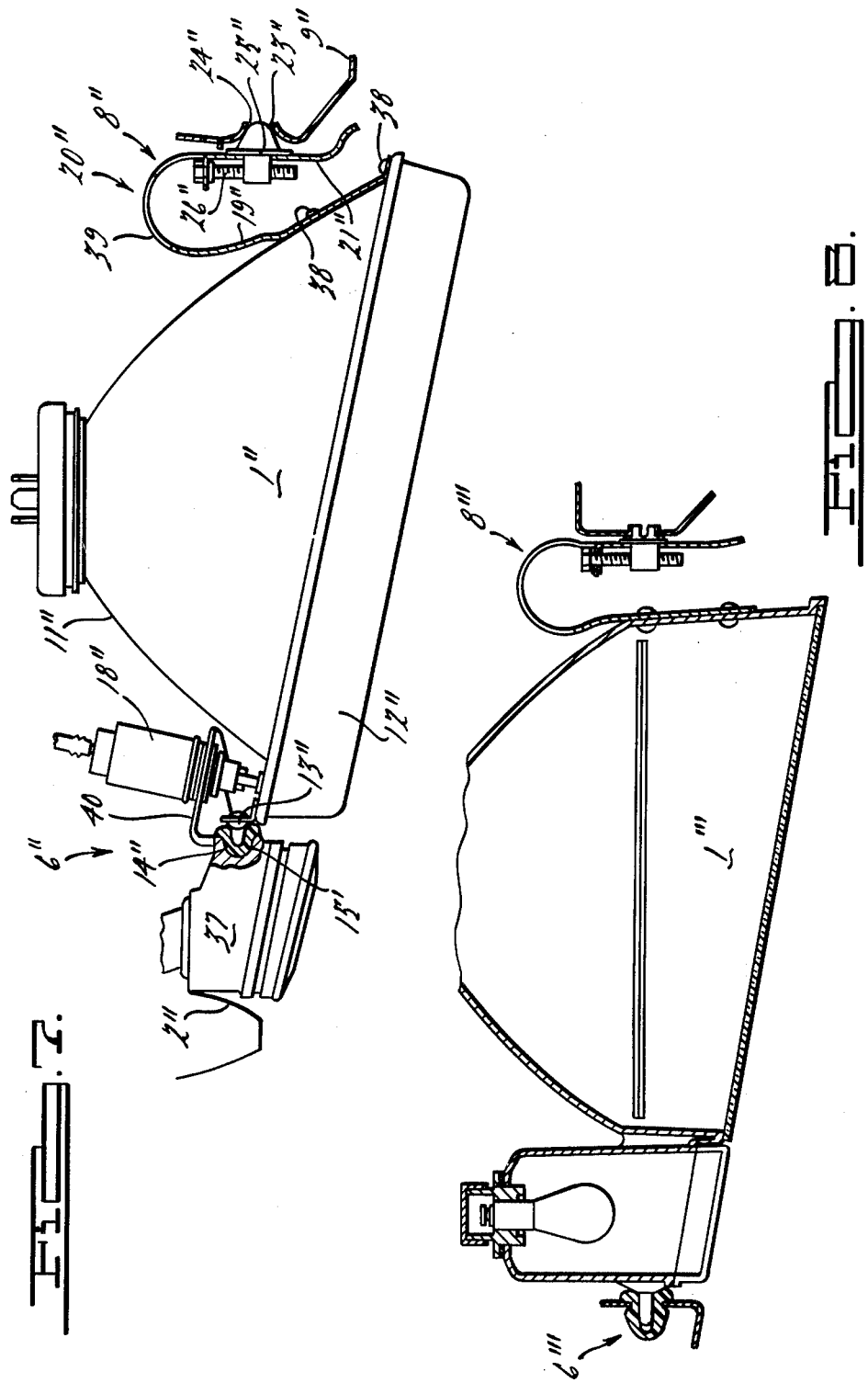

HEADLAMP MOUNTING IN MOTOR VEHICLE BODIES

BACKGROUND OF THE INVENTION

The invention relates to a headlamp mounting in motor vehicle bodies, comprising a headlamp which is supported for swivelling movement with the aid of a fixed point and for adjustment in the forward and rearward directions with the aid of two adjusting devices, and which is adjustable about a substantially horizontal axis and about a substantially vertical axis.

Headlamp mountings of the kind defined above are known in a large variety of types. The known headlamp mountings primarily permit correct adjustments of the headlamp in accordance with lighting requirements, but are not usually suitable to compensate for any deviations of the headlamp contour, in relation to the portion of the body receiving the headlamp, which may occur during the adjustment of the headlamp.

In the past, such compensation was scarcely necessary because with the circular headlamps previously generally used any such deviations were not very disturbing. With the rectangular headlamps which have been increasingly used in recent times these deviations, however, had a disturbing effect and were usually more or less compensated by decorative bezels surrounding the headlamps. Whenever it was desired to dispense with the use of decorative bezels surrounding the headlamps, the difficulties referred to were overcome by the use of expensive types of headlamp having covering glasses fastened to the vehicle body.

The problem underlying the invention is therefore that of improving a headlamp mounting of the kind first defined above in such a manner that, while retaining the inexpensive construction of a headlamp whose covering glass is fastened directly to the reflector or to the spacer extending the latter, the requirements at present imposed on a headlamp mounting such as perfect adjustability in accordance with lighting requirements, stylistically suitable arrangement inside the surrounding portion of the body, and in addition the occupation of little space, low manufacturing cost and simplicity of installation, are fulfilled.

The invention takes as its starting point the prior art as disclosed, for example, in German Auslegeschrift No. 19 30 736, and German Auslegeschrift No. 20 44 253. It must be mentioned, however, that these known headlamp mountings cannot fulfill the requirements indicated above, particularly in respect to stylistically attractive arrangement of the headlamp within the portion of the vehicle body surrounding it.

SUMMARY OF THE INVENTION

According to the invention, the problem mentioned above is solved in that a headlamp mounting of the kind first defined above comprises a combination of special features which is indicated in the main patent claim and refines and supplements them in accordance with the other claims.

Through the combination according to the invention of the partly known features a and b, the vertical axis for the lateral adjustment of the headlamp is placed in a position lying far over to the outside of the vehicle and directly on the component adjoining the headlamp so that through the action of the adjusting according to feature c, which permits extremely simple mounting and adjustment of the headlamp, any changes of position of the headlamp contour on the outer side in relation to the vehicle which may be caused by the lateral adjustment of the headlamp are scarcely noticeable. It is true that as a result the variations of position of the headlamp contour on the inner side in relation to the vehicle are correspondingly greater, but since in motor vehicle construction the engine hood is aligned with the side wings or fenders and since the radiator grille lying in the center of the vehicle can be disposed so as to compensate for tolerances in the position of the headlamp contours, a stylistically attractive arrangement of the headlamps inside the portion of the vehicle body surrounding them can already be achieved in this simple manner without expensive additional measures being required.

Through the refinement of the combination according to features a to c by the feature of claim 2, additional means of compensation are provided in a relatively inexpensive manner, since, for example, vertical displacement of the headlamp contour in relation to the horizontal lower edge of the engine hood can be compensated in a simple manner.

The remaining claims indicate expedient features for headlamp fastenings with the object of reducing on the one hand the space required and on the other hand the cost of manufacture.

DESCRIPTION OF THE DRAWINGS

The invention will be explained in greater detail with the aid of examples of embodiments which are illustrated in the accompanying drawings, in which:

FIG. 7 is a plan view of a simplified headlamp mounting according to the invention, a flashing lamp being disposed next to the headlamp;

FIG. 8 is a simplified section similar to FIG. 2 through another headlamp mounting according to the invention in the case of a one-piece flashing lamp-headlamp constructional unit.

DETAILED DESCRIPTION OF THE INVENTION

Figure 1:
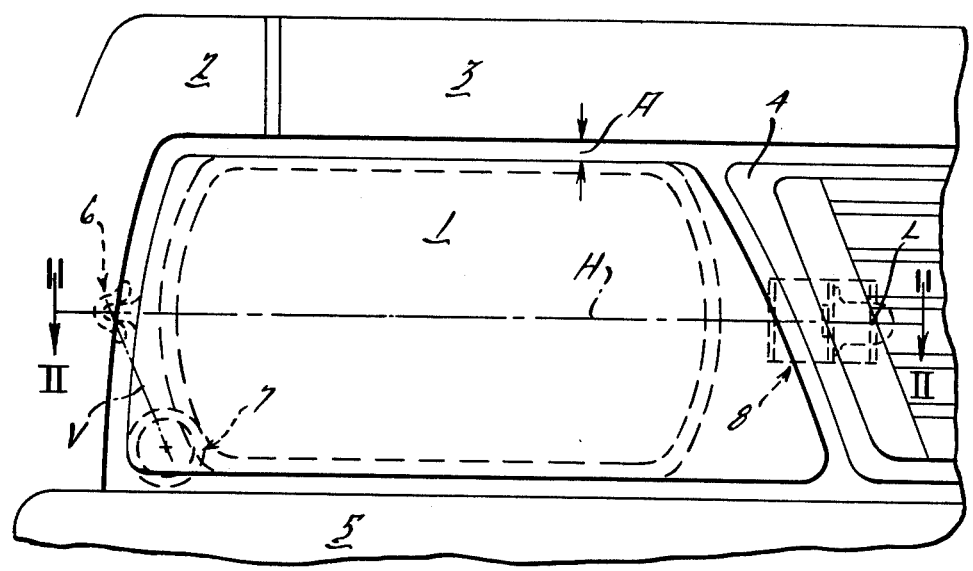
FIG. 1 is a front view of a vehicle headlamp with the neighboring components forming a portion of the vehicle body, and of a headlamp mounting according to the invention.
Figure 3:
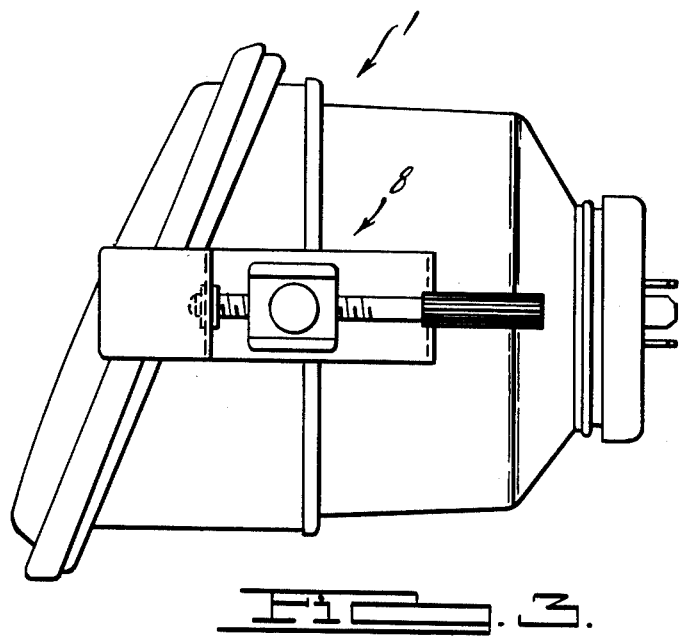
FIG. 3 is a view in the direction of the part III in FIG. 2.
Figure 2:
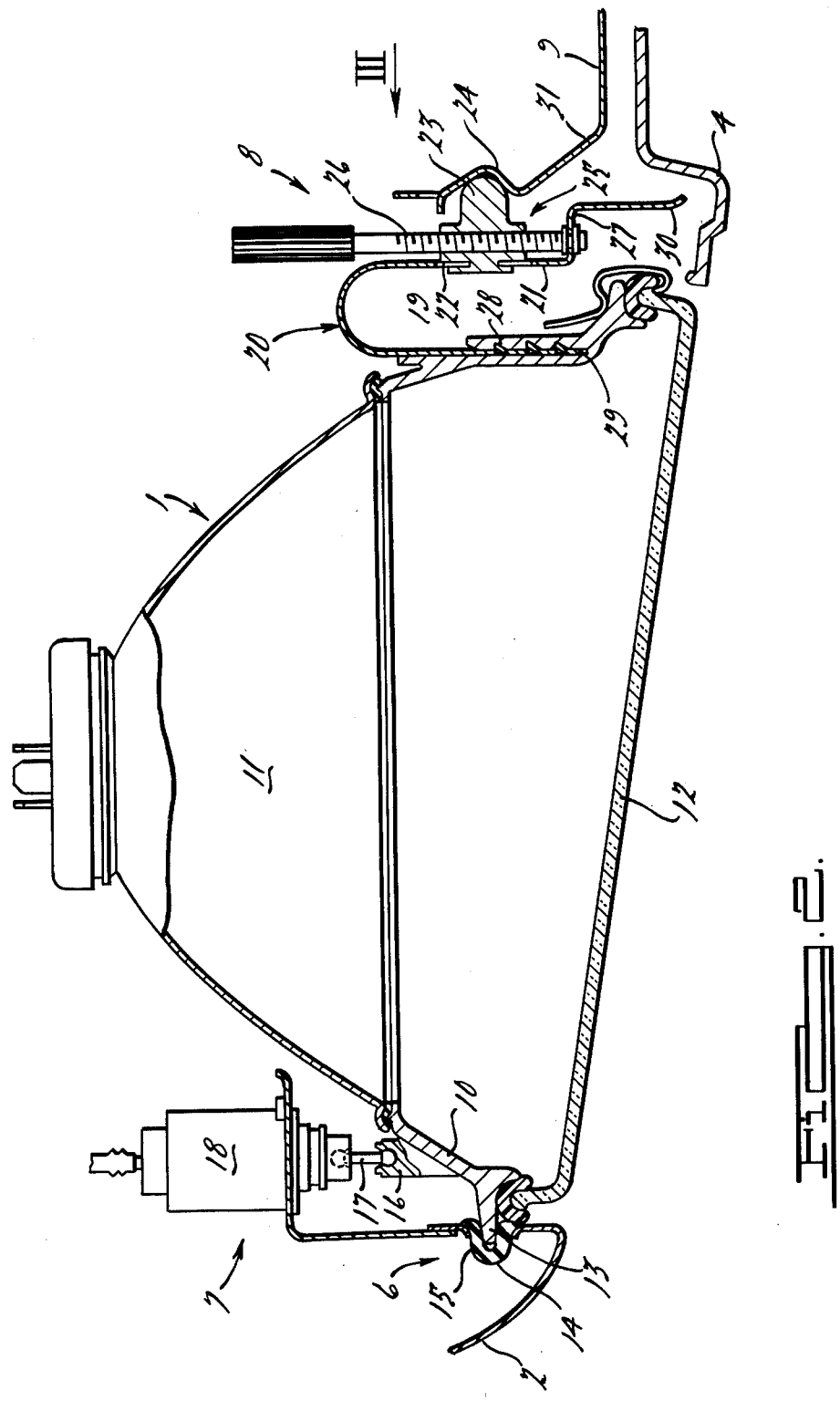
FIG. 2 is a horizontal section on the line II—II in FIG. 1.

In FIGS. 1 to 3, a headlamp 1 is disposed in the portion of the vehicle body formed by the neighboring components, such as the wing or fender 2, engine hood 3, radiator grille 4, and bumper 5.

The headlamp 1 is supported on the wing or fender 2 so as to be laterally adjustable about a substantially vertical axis V extending through a swivellable fixed point 6 and an adjusting device 7 adapted to be displaced forwards and rearwards, and on the middle part 9 of the body so as to be adjustable in respect of its height about a substantially horizontal axis H extending through the swivellable fixed point 6 and an adjusting device 8 which is displaceable forwards and rearwards.

In the form of construction of a headlamp mounting shown in FIGS. 1 to 3 the headlamp 1 consists in known manner of a sheet metal reflector 11, a spacer 10 of plastics material, and a covering disc 12 of glass, all of which parts are sealingly joined together.

The fixed point 6 here consists of a bearing part 13 which is disposed on the outer side of the headlamp 1 in relation to the vehicle and which is here in the form of a bearing pin integrally formed on the spacer 10 of plastics material. The bearing part 13 is received in a holder 14 of elastic plastics material, which is preferably inserted directly in an opening 15 in the component adjoining the headlamp 1, that is to say here the wing or fender 2.

The device 7 for adjusting the headlamp 1 about the horizontal axis H here consists of a bearing part 16 which is disposed at the bottom of the outer side of the headlamp 1 in relation to the vehicle and in which is engaged one end of a double ball-headed member 17 whose other end is connected to a lighting range adjusting device 8 mounted on the vehicle body and adapted to be operated hydraulically, electrically, mechanically or manually.

The device 8 for adjusting the headlamp 1 about the vertical axis V here consists of a U-shaped spring bow 20 which is fastened by one arm 19 on the inner side of the headlamp 1 in relation to the vehicle and which by its other arm 21 is displaceable in relation to a holder 25 received in a guide slot 22 and supported by a locking head 23 in a recess 24 in the middle part 9 of the vehicle body. In this arrangement, the holder 25 is provided with a threaded bore in which is moveably disposed a horizontal adjusting screw 26 one end of which is rotatable but axially fastened so as to act on a bent-over portion 27 of the arm 21, whereby on the rotation of the adjusting screw 26 the latter is displaced inside the threaded bore and carries with it the arm 21 which through the other arm 19 of the spring bow 20 thus swivels the headlamp 1 about the vertical axis V.

One arm 19 of the U-shaped spring bow 20 may, for example, be provided with barbs 28 by means of which it can be secured on the headlamp 1 by simple insertion into a receiving pocket 29 integrally formed on the spacer 10.

The other arm 21 of the U-shaped spring bow 20 may be provided with an extended bent-over operating end 30 by means of which the locking head 23 which is provided on the holder 25 and which on assembly of the headlamp 1 is engaged in the recess 24 by way of an inclined surface 31 on the middle part 9 of the vehicle body can be lifted out by pressure on the operating end 30 for the purpose of dismantling.

Figure 4:
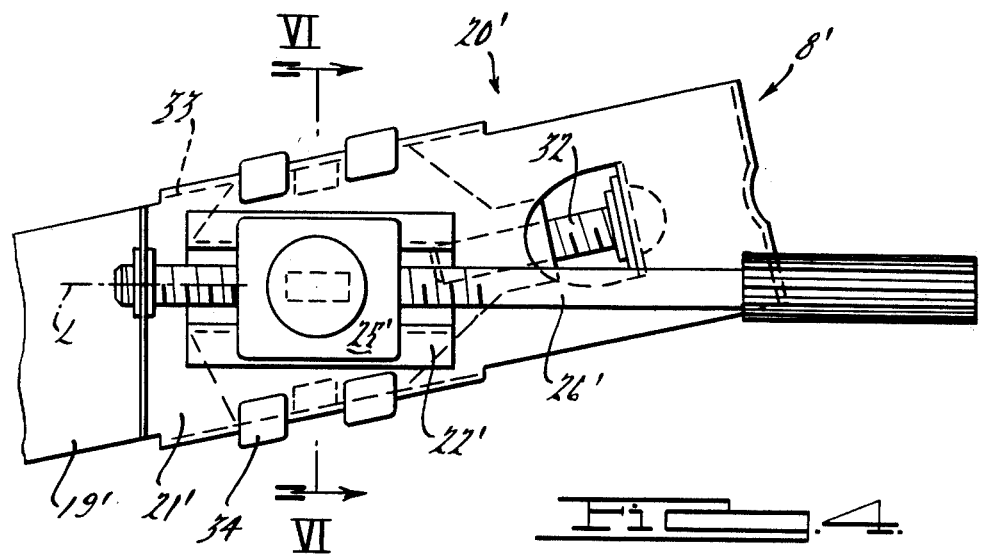
FIG. 4 is a side view of a headlamp mounting according to the invention, with additional facilities for vertical compensation.
Figure 5:
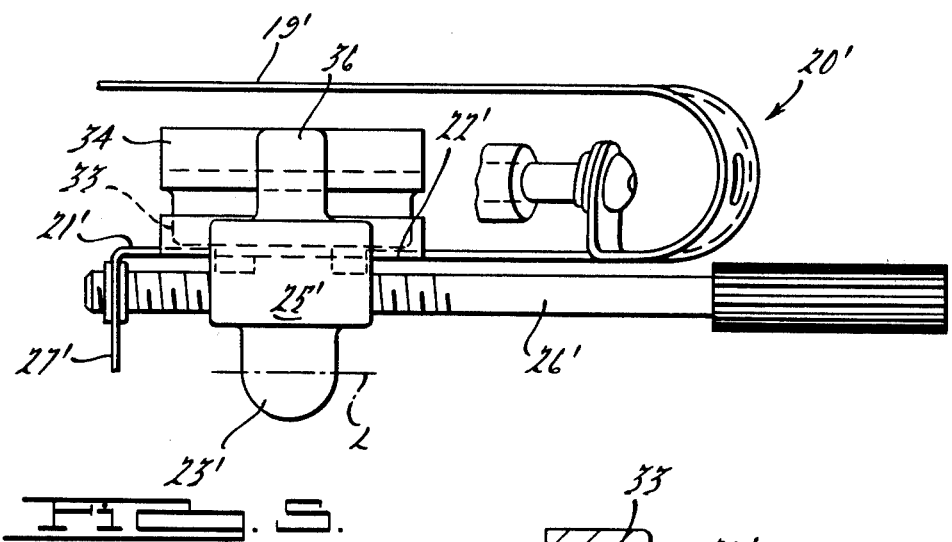
FIG. 5 is a plan view of the headlamp mounting shown in FIG. 4.
Figure 6:
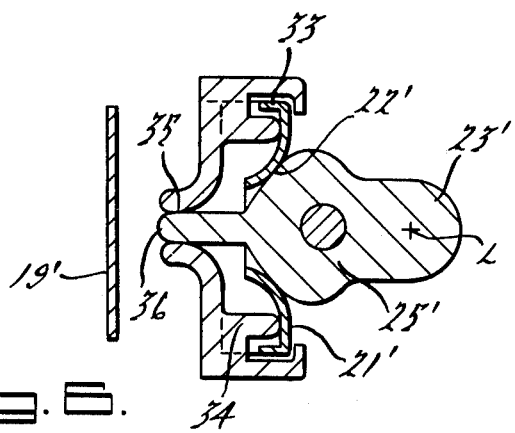
FIG. 6 is a vertical section on the line VI—VI in FIG. 4.

FIGS. 4 to 6 show an improved adjusting device 8' for a headlamp fastening device according to the invention, the parts of which coincide substantially with the parts of the adjusting device 8 and accordingly have been given the same references provided with a prime.

In the adjusting device 8', the U-shaped bow spring 20' is inclined at an angle of about 20° to 30° to the horizontal plane of the headlamp and the guide slot 22' for the holder 25' containing the adjusting screw 26', which is once again disposed horizontally, is still horizontal and thus disposed at an oblique angle to the axis of the arm 21'. The guide slot 22' and the portion of the holder 25' which cooperates with it are so constructed that the swivelling of the holder 25' about a longitudinal axis L extending parallel to the axis of the adjusting screw 26' is possible. The adjusting device 8' has once again a slide 34 of plastics material which is disposed directly behind the guide slot 22' and is adapted to be displaced by means of an adjusting screw 32 along bent-over side edges 33 of the arm 21', and which has a horizontally extending slot slidingly cooperating with a pin 36 on the holder 25'. As soon as the slide 34 is moved by means of the adjusting screw 32 along the axis of the arm 21', the slot and pin connection 35/36 brings about the swivelling of the holder 25' about the longitudinal axis L, whereby deviations A of the headlamp 1 in relation to the horizontal lower edge of the engine hood 3 (see FIG. 1) can be compensated by this vertical alignment.

FIG. 7 shows a modified arrangement of the headlamp and a simplified construction of a headlamp fastening according to the invention.

The headlamp 1" is here shown as a constructional unit which consists essentially of a sheet metal reflector 11" and a covering glass 12" and which laterally directly adjoins a neighoring flashing light 37.

The fixed point 6" is here in the form of a bearing part 13" which is fastened by means of an angle to the sheet metal reflector 11" and which can be inserted into a holder 14" in the form of an elastic plastics bush which is adapted to be inserted directly into a recess 15" in the neighboring flashing light 37, which is fitted and fastened in the region of the front edge of the wing or fender 2". A holder 40 for the lighting range adjusting device 18" may advantageously also be formed at the same time on the flashing light 37.

The adjusting device 8" here consists once again of a U-shaped spring bow 20", of which one arm 19" is here fastened to the sheet metal reflector 11", for example, b rivets 38 or by spot welding. The other arm 21" here receives a very simply constructed adjusting screw 26" on its side remote from the middle part 9" of the vehicle body so that the engagement of the locking head 23" of the holder 25" in the recess 24" in the middle part 9" of the vehicle body in the installation of the headlamp 1" is simplified. In order to permit operation of the adjusting screw 26", the spring bow 20" is provided in its U-shaped region with a slot 39 through which the adjusting screw 26" can be operated by means of a screwdriver.

This embodiment permits the stylistically faultless connection of a headlamp when a flashing lamp is fastened in the region of the front edge of the wing, as is frequently the case particularly with flashing lights extending laterally around the corner of the wind or fender.

FIG. 8 shows simply in a very general manner a similar arrangement of a headlamp to that shown in FIG. 7, while the headlamp is made in unit with the neighboring flashing light to form a one-piece headlamp-flashing lamp constructional unit 1'''. The points 6''' and 8''' of the headlamp fastening according to the invention are correspondingly formed on this unit 1'''.

It is further pointed out that the embodiments shown in FIGS. 7 and 8 obviously both have another adjusting device corresponding to the adjusting device 7 shown in FIGS. 1 to 3, for example, in the form of a lighting range adjuster.

These embodiments may also be provided with an improved adjusting device in accordance with FIGS. 4 to 6.

I claim:

1. A headlamp mounting for motor vehicle bodies, the headlamp being supported for swivelling movement about a fixed pivot point and for adjustment in the forward and rearward directions with the aid of two adjusting devices, and for adjustment about a substantially horizontal axis and about a substantially vertical axis, wherein the improvement comprises:

(a) the fixed pivot point consisting of a bearing part disposed on the outer side of the headlamp in relation to the vehicle, the bearing part being mounted for swivelling movement in a holder part disposed on a neighboring vehicle component;

(b) the adjusting device providing for adjustment about the substantially horizontal axis consisting of a bearing part disposed at the bottom on the outer side of the headlamp in relation to the vehicle and which is connected by a double-headed member to a hydraulically, electrically, mechanically or manually operated lighting range adjusting device which is mounted on the vertical body;

(c) the adjusting device providing for adjustment about the substantially vertical axis consisting of a U-shaped spring bow which is fastened by one arm to the inner side of the headlamp in relation to the vehicle and which by its other arm is adjustable in the forward and rearward directions in relation to a holder received in a guide slot in the spring bow, the holder being supported on the vehicle body in a recess by means of a locking head, the forward and rearward adjustment being obtained by means of a horizontal adjusting screw which is movable in the holder, the adjusting screw having one end rotatable in and axially fastened to act on a bent-over portion of the other arm.

2. A headlamp mounting according to claim 1, wherein the U-shaped spring bow is inclined at an angle of about 20° to 30° to the horizontal plane of the headlamp, the guide slot for the holder receiving the horizontal obliquely to the axis of the other arm to permit the swivelling of the holder about a longitudinal axis extending parallel to the axis of the adjusting screw, while behind the said guide slot a slide is disposed which by means of an adjusting screw can be displaced along the side edges of the arm and which has a horizontal slot in which a flat pin of the holder is slidingly received.

3. A headlamp fastening according to claim 1, wherein the U-shaped spring bow is provided with a slot in its U-shaped region and the adjusting screw is disposed on that side of the holder which lies inside the U-shaped spring bow.

4. A headlamp fastening according to claims 2 or 3 wherein in the case of a headlamp having between its base portion and its lense a spacer of plastics material, the bearing part is in the form of a pin which is formed directly on the spacer and which is swivellably mounted in a holder in the form of an elastic plastics bushing which is adapted to engage in an opening provided directly in the vehicle component, and wherein the one arm of the U-shaped spring bow which is fastened on the headlamp can be fastened by the penetrating action of barbs formed thereon in a receiving pocket formed in the spacer.

5. A headlamp mounting according to claim 1, wherein the bearing part is swivellably mounted in a holder which is adapted to be inserted directly into a recess in a flashing lamp adjoining the headlamp.

6. A headlamp mouting according to claim 2, wherein the bearing part is swivellably mounted in a holder which is adapted to be inserted directly into a recess in a flashing lamp adjoining the headlamp.

7. A headlamp mounting according to claim 3, wherein the bearing part is swivellably mounted in a holder which is adapted to be inserted directly into a recess in a flashing lamp adjoining the headlamp.

8. A headlamp mounting according to claim 4, wherein the bearing part is swivellably mounted in a holder which is adapted to be inserted directly into a recess in a flashing lamp adjoining the headlamp.

9. A headlamp according to claim 1, wherein in the case of a headlamp having a flashing lamp integrally formed on a spacer of plastics material or a flashing lamp integrally formed on a headlamp casing of plastics material the fixed point is disposed on the outer part of this assembly in relation to the vehicle and the adjusting device is disposed on the inner part of the said assembly in relation to the vehicle.

10. A headlamp mounting according to claim 2, wherein in the case of a headlamp having a flashing lamp integrally formed on a spacer of plastics material or a flashing lamp integrally formed on a headlamp casing of plastics material the fixed point is disposed on the outer part of this assembly in relation to the vehicle and the adjusting device is disposed on the inner part of the said assembly in relation to the vehicle.

11. A headlamp mounting according to claim 3, wherein in the case of a headlamp having a flashing lamp integrally formed on a spacer of plastics material or a flashing lamp integrally formed on a headlamp casing of plastics material the fixed point is disposed on the outer part of this assembly in relation to the vehicle and the adjusting device is disposed on the inner part of the said assembly in relation to the vehicle.

12. A headlamp mounting according to claim 4, wherein in the case of a headlamp having a flashing lamp integrally formed on a spacer of plastics material or a flashing lamp integrally formed on a headlamp casing of plastics material the fixed point is disposed on the outer part of this assembly in relation to the vehicle and the adjusting device is disposed on the inner part of the said assembly in relation to the vehicle.

13. A headlamp mounting according to claim 5, wherein on the flashing lamp which is provided with the holder for the bearing part forming the fixed point a holder for the lighting range adjusting device is at the same time integrally formed.

* * * * *